United States Patent [19]
Reed et al.

[11] 3,758,596
[45] Sept. 11, 1973

[54] PROCESS FOR THE PRODUCTION OF PHENOLIC COMPOUNDS AND INTERMEDIATES FOR USE THEREIN

[75] Inventors: Hugh Wilma Boulton Reed; John Smith; Ian Hirst, all of Stockton-on-Tees, England

[73] Assignee: Imperial Chemical Industries Limited, London, England

[22] Filed: Apr. 7, 1970

[21] Appl. No.: 26,445

[30] Foreign Application Priority Data
Apr. 21, 1969  Great Britain.................. 20,220/69

[52] U.S. Cl....... 260/613 D, 260/396 R, 260/465 F, 260/547, 260/575, 260/625, 260/619 B, 260/586 R, 260/613 R
[51] Int. Cl...................... C07c 43/22, C07c 41/00
[58] Field of Search................... 260/396 R, 613 D, 260/624 R

[56] References Cited
FOREIGN PATENTS OR APPLICATIONS
1,200,810   5/1966   Germany ........................... 260/396

OTHER PUBLICATIONS
Rieker et al., Tetrahedron Letters No. 48(1968) 4969--4972
Coppinger et al. (I), J.A.C.S., Vol. 75 (1953) 734–736
Coppinger (II), J.A.C.S., Vol. 86 (1964) 4385–4388

*Primary Examiner*—Bernard Helfin
*Attorney*—Cushman, Darby & Cushman

[57] ABSTRACT

Specified cyclic dienones are converted to substituted phenols, for example 4-methoxy-2,6-di-tert.butyl phenol, by treatment with acids.

14 Claims, No Drawings

PROCESS FOR THE PRODUCTION OF PHENOLIC COMPOUNDS AND INTERMEDIATES FOR USE THEREIN

THIS INVENTION relates to processes for the production of phenolic compounds.

According to the invention certain cyclic dienones are converted to corresponding phenolic compounds by contacting them in a liquid phase with hydrogen ions, preferably at a temperature within the range of from 50° to 200°C.

The dienone starting materials are of formula:

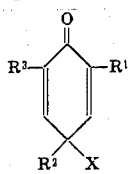

in which X is OH, CN, OR, $NH_2$, NHR, or $NR_2$, in which R is an alkyl group having from one to 20 carbon atoms and preferably from one to eight carbon atoms, or X is a group Z of formula:

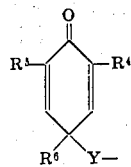

in which Y is a group of formula $(CH_2)_n$ or $C_nH_{2n-2}$, $n$ being an interger preferably in the range 1 to 5; $R^1$, $R^3$, $R^4$, and $R^5$ are individually hydrogen atoms or alkyl groups, at least one and preferably both of $R^1$ and $R^3$ are alkyl groups, and at least one and preferably both of $R^4$ and $R^5$ when X is a group Z are alkyl groups, preferably having one to 20 carbon atoms and more preferably being tertiary alkyl groups having from four to eight carbon atoms or cyclohexyl groups, and $R^2$ and, when X is a group Z, $R^6$ are alkyl groups having from two to 20 carbon atoms and preferably from four to eight carbon atoms and are preferably secondary and more preferably tertiary alkyl groups.

The corresponding phenolic compounds produced from these dienones have the formula;

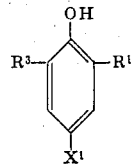

wherein $X^1$ is as previously defined for X, except that where X is a group Z, $X^1$ is a group of formula

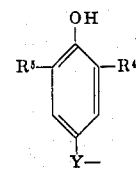

The process is preferably carried out in the presence of a solvent which may be for example dimethyl formamide, dimethyl sulphoxide, an ether, toluene or benzene. Alcohols are preferably used as solvents when the group X in the phenolic compound is an OR group corresponding to the alcohol.

When 4-methoxy-2, 6-di-tert.butyl phenol is to be produced it is preferred that the solvent should be an alcohol having one to three carbon atoms, especially methanol. We have found that the product can be precipitated in good yield and purity from solutions in methanol by adding water to the solution. This fact is of great importance since if the 4-methoxy-2,6-di-tert. butyl phenol is to be used as a food additive its purity is critical, and the purer the precipitated product the less further purification will be required. Part of the methanol may be distilled off before the water is added.

It is preferred that from 0.5 to 5 parts of water by weight be added per part by weight of methanol present to precipitate the 4-methoxy-2,6-di-tert.butyl phenol.

The concentration of hydrogen ions is preferably 0.05 to 20 equivalents and preferably 2 to 10 equivalents per mole of the reactant. Such ions may be produced by providing for the presence of HCl, HBr, HI, or preferably $H_2SO_4$. Oxidising acids, for example $HNO_3$ must be used with caution as oxidation of the product, for example to a quinone, may occur.

Cyclohexa dienones for use in this invention may be prepared in a variety of ways, for example compounds in which a Cl or Br atom is present instead of X may be produced by reacting a compound of formula:

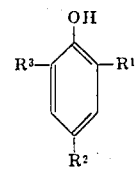

in which $R^1$, $R^2$ and $R^3$ are as previously defined; with chlorine or bromine at a temperature of at most 0°C. and preferably at a temperature in the range −15° to 0°C, in the presence of a polar solvent. Preferably an excess of chlorine or bromine is fed which may be for example a 5 to 20 percent excess over the stoichiometric quantity.

The product of the above reaction is then further reacted to exchange the chlorine or bromine atom by a group X. This may be accomplished in many cases readily ascertainable by trial by reacting it with a compound of formula HX especially an alcohol of formula ROH or $X^-$ ions, preferably at a temperature in the range 50° to 150°C. and more preferably in the range 70° to 120°C in the presence of an alkali. The compound of formula HX or $X^-$ ions are preferably provided in excess over the stoichiometric amount, for example an excess of from 5 to 20 percent may be employed. The alkali may suitably be sodium, potassium or lithium hydroxide or carbonate. Where the group X to be introduced is an $NH_2$, NHR, or $NR_2$ group it may, as the compound of formula HX may itself be sufficiently alkaline, be unnecessary to add additional alkali. The alkali is preferably provided in an excess by molar proportion of for example 10 to 100 percent.

The cyclohexadienones having a Cl or Br atom instead of X may be converted to the corresponding compound in which the Cl or Br atom is replaced by an OH group by reaction as above in the absence of any compound of formula HX other than water.

An alkyl phenol of the above formula may also be converted directly to a cyclohexadienone as before defined in which the group X is an alkoxy group by reacting it with an alkali metal hypochlorite or hypobromite, for example sodium hypochlorite, in a proportion of from 1.5 to 3 moles of hypochlorite or hypobromite per mole of alkyl phenol, and the corresponding alcohol, preferably in a molar excess of 200 to 500 percent, preferably under reflux and optionally in the presence of a polar solvent other than the alcohol. Suitable temperatures for this reaction are from 50° to 150°C., and preferably from 60° to 120°C.

We have found that if an alkali metal hypochlorite is added to 2,4,6-tri-tert.butyl phenol in the presence of methanol at a temperature of at least 50°C, under reflux over a period of 5 and preferably 15 minutes to 5 hours, and more preferably 30 minutes to 3 hours and preferably maintained at a temperature of at least 50°C, subsequently for at least 15 minutes, for example by refluxing, the total period of heating to a temperature in excess of 50°C, after the commencement of the addition of hypochlorite being preferably in the range 1 to 5 and more preferably 2 to 4 hours, the yield of 4-methoxy-2,4,6-tri-tert.butyl cyclohexadi-2,5-ene-1-one is increased.

Polar solvents which may be used in preparing the cyclodienones for use in the present invention include alcohols having one to three carbon atoms, water ethylene glycol, acetonitrile, formic and acetic acids, dimethyl formamide and dimethyl sulphoxide.

According to a preferred form of the invention 2,4,6-tri-tert. butyl phenol is converted to 4-methoxy-2,6-di-tert.butyl phenol by a process which comprises adding to a solution of 2,4,6-tri-tert. butyl phenol in methanol at a temperature in the range 50° to 120°C, an equimolar amount or preferably an excess over the equimolar amount of sodium or potassium hypochlorite based on the 2,4,6-tri-tert,butyl phenol during a period of 5 preferably 15 minutes to 5 hours, diluting with water to produce an aqueous and a non-aqueous phase, separating the non-aqueous phase, dissolving it in methanol, adding an acid, heating, preferably to reflux, and adding water to precipitate 4-methoxy-2,6-di-tert.butyl phenol.

EXAMPLE 1

A mixture of 2,4,6-tri-tert.butyl phenol (300 grams), methyl alcohol (600 ml.) and acetic acid (600 ml.) was stirred and cooled to −10°C. Chlorine gas was then passed into the mixture at a rate of 35 litres per hour measured at room temperature and atmospheric pressure until 85 grams of chlorine had been absorbed, the temperature being kept in the range −10° to 0°C throughout.

The product was filtered and 260 grams of a pale yellow solid was recovered. The solid contained 95 percent by weight of 4-chloro-2,4,6-tri-tert.butyl-cyclohexa-2,5-dienone-1.

20 grams of the solid were dissolved in 400 ml. of methyl alcohol and 3.6 grams of sodium hydroxide was added. The resulting solution was heated under reflux at 67°C for 2 hours and then cooled and 8.8 grams of 95 percent sulphuric acid were added. The material resulting was refluxed for 3 hours at 67°C and then 300 ml. of the methyl alcohol was distilled off.

The distillation residue was added to 200 ml. of water and a cream precipitate which was produced was filtered off, dried and recrystallised from methyl alcohol. The crystalline product (12.5 grams) having a melting point of 102° − 3°C, was recovered and was shown to be 2,6-di-tert.butyl-4-methoxy phenol by comparison with an authentic sample using infra red spectroscopy, nuclear magnetic resonance and mixed melting point.

EXAMPLE 2

2,4,6-tri-tert.butyl phenol (0.5 mole) was dissolved in methanol (800 ml.) and the solution was heated to reflux under atmospheric pressure. 300 ml. of an aqueous solution of sodium hypochlorite containing 12 percent by weight of available chlorine (which was prepared by reacting a 40 percent weight aqueous sodium hydroxide solution with chlorine gas) was added over a period of 2 hours whilst refluxing at a temperature of 65° to 72°C. Refluxing was continued for a further 2 hours and the mixture was then diluted with water (500 ml.) and cooled to 20°C.

The product separated into two layers, the upper of which was separated and was shown by gas liquid chromatography to contain 4-methoxy-2,4,6-tri-tert.butyl cyclohexadi-2,5-ene-1-one (82 percent yield based on the 2,4,6,tri-tert.butyl phenol fed) and 4-hydroxy-2,4,6-tri-tert.butyl cyclohexadi-2,5,-ene-1-one (16 percent yield based on the 2,4,6-tri-tert.butyl phenol fed). The conversion of the 2,4,6-tri-tert.butyl phenol was 96 percent.

The upper layer weighed 178 grams. It was dissolved in methanol (900 ml.) and concentrated sulphuric acid (178 grams) was added. The mixture was refluxed for 2 hours, cooled and 1,800 ml. of water was added. A creamy precipitate (123 grams) was produced. This consisted of 4-methoxy-2,6-di-tert.butyl phenol (80 percent by weight) the major impurities being 2,4,6-tri-tert.butyl phenol and water.

The precipitate was dissolved in 330 ml. of methanol, at 55°C and the solution was cooled to 20°C., and filtered. Crystals of 4-methoxy-2,6-di-tert.butyl phenol (70 grams) were recovered. These had a melting point of 103° to 104°C, and were identified by carrying out a mixed melting point determination and also by infra red and nuclear magnetic resonance spectroscopy.

EXAMPLE 3

Following the procedure of Hatchard, Lipscomb and Stacey (J. Amer. Chem. Soc. 1958, Vol. 80, Page 3636) a compound of formula:

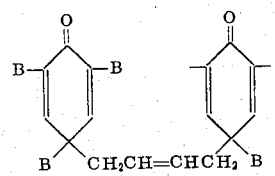

together with isomers was prepared. The producct contained the isomers of formula:

as shown by nuclear magnetic resonance. It had a melting point of 159° — 163°C. The spectroscopic evidence and elemental analysis supported the above structures.

1 g. of the above product was dissolved in MeOH (100 ml.) and 1 g. of concentrated $H_2SO_4$ added. The solution was refluxed for 2 hours producing a pink solution which was poured into water and extracted with ether. The ether was evaporated and a pale pink solid was left. This was recrystalised from a water/ethanol mixture giving a material having a melting point of 103° — 105°C (0,8g.). By thin layer chromatography on $Al_2O_3$ using a mixture of 80 percent benzene and 20 percent cyclohexane as elutant, this product was shown to consist of 3 components which were identified by spectroscopic methods as:

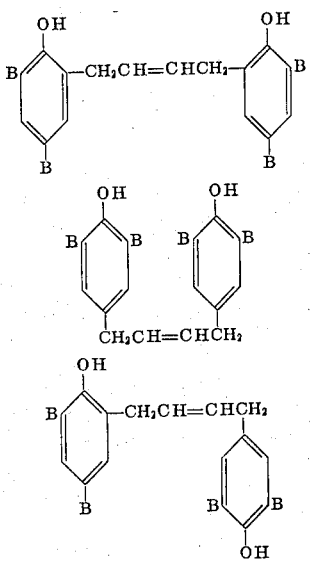

The symbol B in the formulae represents a tert.butyl group.

EXAMPLE 4

To a solution of 4-methoxy-2,4,6-tri-tert.butyl cyclohexadi-2,5-ene one-1 (2g.) in benzene (50 ml.) under a nitrogen atmosphere was added $HNO_3$(2g.). The solution was stirred for 30 minutes at 40° – 50°C and washed with three 150 ml portions of water. The benzene layer was evaporated and gave an oil which crystallised to give pale yellow crystals of 4-methoxy-2,4,6-tri-tert.butyl phenol.

EXAMPLE 5

4-hydroxy-2,4,6-tri-tert.butyl cyclohexa-2,5-dienone-1 (2g.) concentrated sulphuric acid (2g.) and methanol (50 ml.) was refluxed under a nitrogen atmosphere for 2 hours. A red solution was produced and was poured into about 150 ml. of water. This was extracted with ether three times with 100 ml. portions. The ether was dried over anhydrous $Na_2SO_4$ and evaporated leaving crystals of 4-hydroxy-2,6-di-tert.butyl phenol.

EXAMPLE 6

4-methoxy-2,4,6-tri-tert.butyl cyclohexadi-2,5-ene-one-1 (2g), MeOH (50 ml.) and constant boiling hydrochloric acid (2g.) were refluxed together for 1 hour. The product was poured into 150 ml. of water and extracted with two 100 ml. portions of ether. The ether was then evaporated to give 4-methoxy-2,6-di-tert.butyl phenol as a white crystalline solid (1.5 g).

We claim

1. A process for preparing 4-methoxy-2,6-ditert. butyl phenol which comprises converting 4-methoxy 2,4,6 tri-tert. butyl cyclohexa-di-2,5-ene-1-one to said 4-methoxy-2,6-di-tert. butyl phenol by contacting under reflux conditions the 4-methoxy-2,4,6-tri-tert.butyl cyclohexa-di-2,5-ene-1-one, in solution in an alcohol having 1 to 3 carbon atoms with hydrogen ions the source of which is an acid selected from the group consisting of HCl, HBr, HI and $H_2SO_4$.

2. A process as claimed in claim 1 in which the temperature is 50° to 200°C.

3. A process as claimed in claim 1 which is carried out in the presence of methanol as said alcohol.

4. A process as claimed in claim 3 in which the product is precipitated from solution in methanol by adding water.

5. A process as claimed in claim 4 in which 0.05 to 20 equivalents of hydrogen ions are present per mole of dienone.

6. A process as claimed in claim 1 in which the source of the hydrogen ions is sulphuric acid.

7. A process for preparing 4-methoxy-2,6-di-tert.-butyphenol, which comprises converting 2,4,6-tri-tert.butyl phenol to 4-methoxy-2,6-di-tert.butyl phenol by adding to a solution of 2,4,6 tri-tert. butyl phenol in methanol at a temperature in the range 50° to 120° C, at least an equimolar amount of sodium or potassium hypochlorite based on the 2,4,6 tri-tert.butyl phenol during a period of 5 minutes to 5 hours, diluting with water to produce an aqueous and a non-aqueous phase, separating the non-aqueous phase containing 4-methoxy-2,4,6-di-tert.butyl cyclohexa-di-2,5-ene-1-one, dissolving it in methanol, adding an acid selected from the group consisting of HCl, HBr, HI and $H_2SO_4$ so that the hydrogen ion equivalents per mole of dienone is in the range of 0.05 to 20, refluxing, and adding water to precipitate 4-methoxy-2,6 di-tert.butyl phenol.

8. A process for preparing 4-methoxy-2,6-di-tert-butyl phenol which comprises converting 2,4,6-tri-tert.butyl phenol to 4-methoxy-2,6-di-tert.butyl phenol by adding to a solution of 2,4,6-tri-tert. butyl phenol in methanol at a tempterature in the range 50° to 120°C. at least an equimolar amount of sodium or potassium hypochlorite based on the 2,4,6-tri-tert.butyl phenol during a period of 5 minutes to 5 hours, diluting with water to produce an aqueous and a non-aqueous phase, separating the non-aqueous phase, heating it in the presence of a $C_{1-3}$ alcohol solvent and an acid selected from the group consisting of HCl, HBr, HI and $H_2SO_4$ so that the hydrogen ions are in the range of 0.5 to 20 equivalents per mole of dienone, to a temperature of from 50° C to 200° C, and separating 4-methoxy-2,6-di-tert.butyl phenol.

9. A process for preparing 4-methoxy-2,6-di-tert. butyl phenol which comprises converting 2,4,6-tri-tert. butyl phenol to 4-methoxy-2,4,6-tri-tert. butyl cyclohexa-di-2,5-ene-1 one by reacting said phenol with an alkali metal hypochlorite or hypobromite in the presence of a polar solvent selected from the group consisting of alcohols having 1 to 3 carbon atoms, water, ethylene glycol, acetonitrile, formic acid, acetic acid, dimethyl formamide and dimethyl sulphoxide, and then converting the resulting 4-methoxy-2,4,6-tri-tert. butyl cyclohexa-di-2,5-ene-1-one to 4-methoxy 2,6-di-tert. butyl phenol by heating in an alcohol having one to three carbon atoms in the liquid phase with hydrogen ions supplied by an inorganic acid selected from the group consisting of HCl, HBr, HI and $H_2SO_4$.

10. A process as claimed in claim 9 wherein the 2,4,6-tri-tert.butyl phenol is converted to said dienone by reacting the same with methanol and an alkali metal

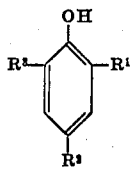

hypochlorite or hypobromite in a proportion of 1.5 to 3 moles of hypochlorite or hypobromite per mole of said phenol.

11. A process as claimed in claim 10 in which a molar excess of 200 to 500 percent of the alcohol is present.

12. A process as claimed in claim 11 when carried out under reflux.

13. A process as claimed in claim 12 in which an alkali metal hypochlorite is added to 2,4,6-tri-tert.butyl phenol in the presence of methanol at a temperature of at least 50°C under reflux over a period of 5 minutes to 5 hours, maintaining the temperature in excess of 50°C after the commencement of the addition of hypochlorite for a period in the range 1 to 5 hours.

14. A process as claimed in claim 13 in which the temperature is maintained in excess of 50°C for a period of at least 15 minutes after the completion of the addition of the alkali metal hypochlorite.

* * * * *

UNITED STATES PATENT OFFICE
CERTIFICATE OF CORRECTION

Patent No. 3,758,596         Dated September 11, 1973

Inventor(s) Hugh Wilma Boulton Reed et al

It is certified that error appears in the above-identified patent and that said Letters Patent are hereby corrected as shown below:

(1) In the heading Foreign Application Priority Data should be added as follows:

-- Sept. 8, 1969    Great Britain    44344/69 --

(2) In the heading, the listed Foreign Application Priority Data should read --20270/69--.

Signed and sealed this 9th day of July 1974.

(SEAL)
Attest:

McCOY M. GIBSON, JR.                C. MARSHALL DANN
Attesting Officer                   Commissioner of Patents